US008885062B2

(12) United States Patent
Yoshino et al.

(10) Patent No.: US 8,885,062 B2
(45) Date of Patent: Nov. 11, 2014

(54) AUTO WHITE BALANCE ADJUSTMENT SYSTEM, AUTO WHITE BALANCE ADJUSTMENT METHOD, AND CAMERA MODULE

(75) Inventors: Akira Yoshino, Tokyo (JP); Keiichiro Yanagida, Tokyo (JP); Noriko Matsuo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 108 days.

(21) Appl. No.: 13/238,400

(22) Filed: Sep. 21, 2011

(65) Prior Publication Data

US 2012/0147211 A1    Jun. 14, 2012

(30) Foreign Application Priority Data

Dec. 10, 2010   (JP) .................................. 2010-275989

(51) Int. Cl.
*H04N 5/235*    (2006.01)
*H04N 5/76*    (2006.01)
*H04N 9/73*    (2006.01)

(52) U.S. Cl.
CPC .................................... *H04N 9/735* (2013.01)
USPC .................................... 348/223.1; 348/229.1

(58) Field of Classification Search
USPC .............. 348/223.1, 225.1, 229.1, 272, 222.1
See application file for complete search history.

(56) References Cited

U.S. PATENT DOCUMENTS

| 4,736,241 A | * | 4/1988 | Murakami et al. | ......... | 348/225.1 |
| 5,398,058 A | * | 3/1995 | Hattori | ....................... | 348/224.1 |
| 5,563,654 A | * | 10/1996 | Song | .......................... | 348/223.1 |
| 7,580,061 B2 | * | 8/2009 | Toyoda | ....................... | 348/223.1 |
| 7,593,043 B2 | * | 9/2009 | Uezono | ....................... | 348/222.1 |
| 7,804,525 B2 | * | 9/2010 | Subbotin | .................... | 348/223.1 |
| 7,864,222 B2 | * | 1/2011 | Yoshino et al. | ............ | 348/223.1 |
| 8,164,648 B2 | * | 4/2012 | Takahashi | .................. | 348/223.1 |
| 2008/0174673 A1 | * | 7/2008 | Takahashi | .................. | 348/223.1 |

FOREIGN PATENT DOCUMENTS

| JP | 11-168750 | 6/1999 |
| JP | 2008-5540 | 1/2008 |
| JP | 2008-72575 | 3/2008 |
| JP | 2008-109505 | 5/2008 |
| JP | 2010-114667 | 5/2010 |
| JP | 2010114667 A | * 5/2010 |

OTHER PUBLICATIONS

Office Action issued Jan. 7, 2014 in Japanese Application No. 2010-275989 (With English Translation).

* cited by examiner

*Primary Examiner* — Ahmed A Berhan
(74) *Attorney, Agent, or Firm* — Oblon, Spivak, McClelland, Maier & Neustadt, L.L.P.

(57) ABSTRACT

According to one embodiment, an auto white balance adjustment system includes a first color judgment gate generation unit and a second color judgment gate generation unit. The second color judgment gate generation unit defines a color-temperature range subject to a white balance adjustment for each light source. The color judgment gate switch unit switches between the first color judgment gate and the second color judgment gate, as a reference for selecting pixel data used for calculating the white balance gain.

20 Claims, 9 Drawing Sheets

- ● A LIGHT SOURCE
- △ D LIGHT SOURCE
- □ C LIGHT SOURCE

- ● A LIGHT SOURCE
- △ D LIGHT SOURCE
- □ C LIGHT SOURCE

AUTO WHITE BALANCE ADJUSTMENT SYSTEM, AUTO WHITE BALANCE ADJUSTMENT METHOD, AND CAMERA MODULE

CROSS-REFERENCE TO RELATED APPLICATIONS

This application is based upon and claims the benefit of priority from the prior Japanese Patent Application No. 2010-275989, filed on Dec. 10, 2010; the entire contents of all of which are incorporated herein by reference.

FIELD

Embodiments described herein relate generally to an auto white balance adjustment system, an auto white balance adjustment method, and a camera module.

BACKGROUND

Normally, an imaging apparatus performs a white balance adjustment on an image signal according to a color temperature of a light source. For example, the imaging apparatus corrects with a white balance adjustment in such a way that the white object is shot as white even in a case where the white object is under greenish reflecting fluorescent light or under reddish reflecting incandescent light. A system that automatically performs such a white balance adjustment is called AWB (auto white balance adjustment) system.

The AWB system sets a color-temperature range subject to a white balance adjustment as a color judgment gate. The color judgment gate is considered as a reference based on which a tinged color portion affected by light from a light source of achromatic color is selected from a chromatic color portion. The AWB system integrates pixel data selected by the color judgment gate for each frame, which is divided by the pixel count subject to integration, so as to calculate an average value of the pixel data per each pixel for every frame. For example, when integrating a color-difference signal, the AWB system implements an adjustment using such a white balance gain that the calculated average value becomes zero.

In a conventional system, the color judgment gate is set in such a way that various types of light-source colors, ranging from a light source having a low color temperature to a light source having a high color temperature, are included. In this setting, a color other than the light-source colors may also be included for the selection of the color judgment gate. For example, if an object having hue of low saturation such as a bluish or cyanic tint is shot under the incandescent light, the reddishness resulting from the incandescent light and a blue tinge of the object are balanced as if an achromatic (neutral) color, and may enter the range of color judgment gate. In such a case, even a color other than the light-source color is included in the integration target, resulting in a white balance adjustment in which an ideal point is not reached. In the preceding example of under the incandescent light, the white balance adjustment is performed with a trace of slight reddishness.

DETAILED DESCRIPTION

In general, according to one embodiment, an auto white balance adjustment system includes a white balance adjustment unit, a first color judgment gate generation unit, a second color judgment gate generation unit, and a color judgment gate switch unit. The white balance adjustment unit performs a white balance adjustment by way of multiplication of a white balance gain, on an image signal. The first color judgment gate generation unit generates a first color judgment gate. The first color judgment gate defines an entire color-temperature range subject to a white balance adjustment. The second color judgment gate generation unit generates a second color judgment gate. The second color judgment gate defines a color-temperature range subject to a white balance adjustment, for each light source identified according to the white balance gain. The color judgment gate switch unit switches between a first color judgment gate and a second color judgment gate, as a reference for selecting pixel data used in calculation of the white balance gain.

Exemplary embodiments of an auto white balance adjustment system, an auto white balance adjustment method, and a camera module will be explained below in detail with reference to the accompanying drawings. Further, the present invention is not limited to the following embodiments.

Figure 1:
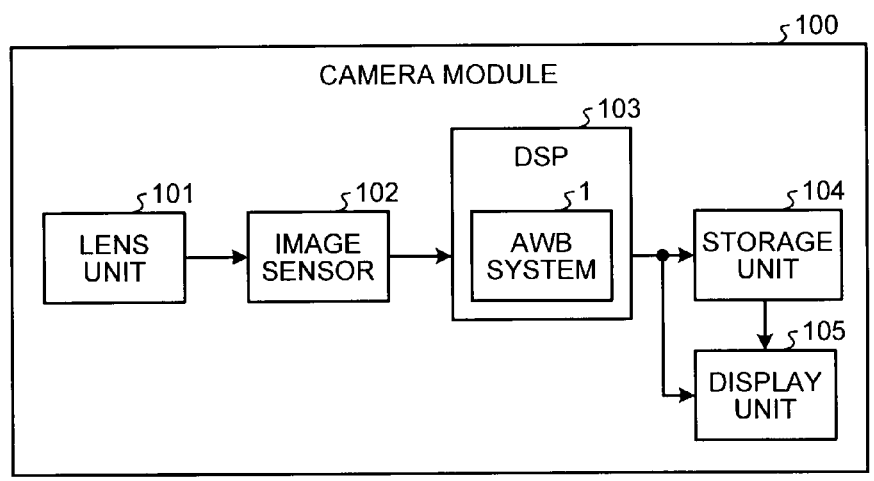
FIG. 1 is a block diagram illustrating the schematic configuration of a camera module to which an AWB system according to a first embodiment is applied.

FIG. 1 is a block diagram illustrating the schematic configuration of a camera module to which an AWB system according to a first embodiment is applied. For example, a camera module 100 is a digital camera. The camera module 100 includes a lens unit 101, an image sensor 102, a DSP (Digital Signal Processor) 103, a memory unit 104, and a display unit 105. The camera module 100 may also be an electronic device, such as a mobile phone with camera, other than a digital camera.

The lens unit 101 takes in light from an object and focuses an object image onto the image sensor 102. The image sensor 102 converts the light taken in by the lens unit 101 into a signal charge to capture the object image. The image sensor 102 generates an analog signal by capturing red (R), green (G), and blue (B) signal values according to Bayer pattern and converts the obtained signals to a digital format from an analog format.

The DSP 103 performs various processes on the image signal from the image sensor 102. The DSP 103 functions as an image processing apparatus. The DSP 103 is equipped with an AWB system 1. The AWB system 1 performs a white balance adjustment on the image signal. Moreover, the ISP 103 performs an automatic exposure, matrix process, an edge enhancement, a luminance compression, and a gamma process, for example, on the image signal.

Figure 2:
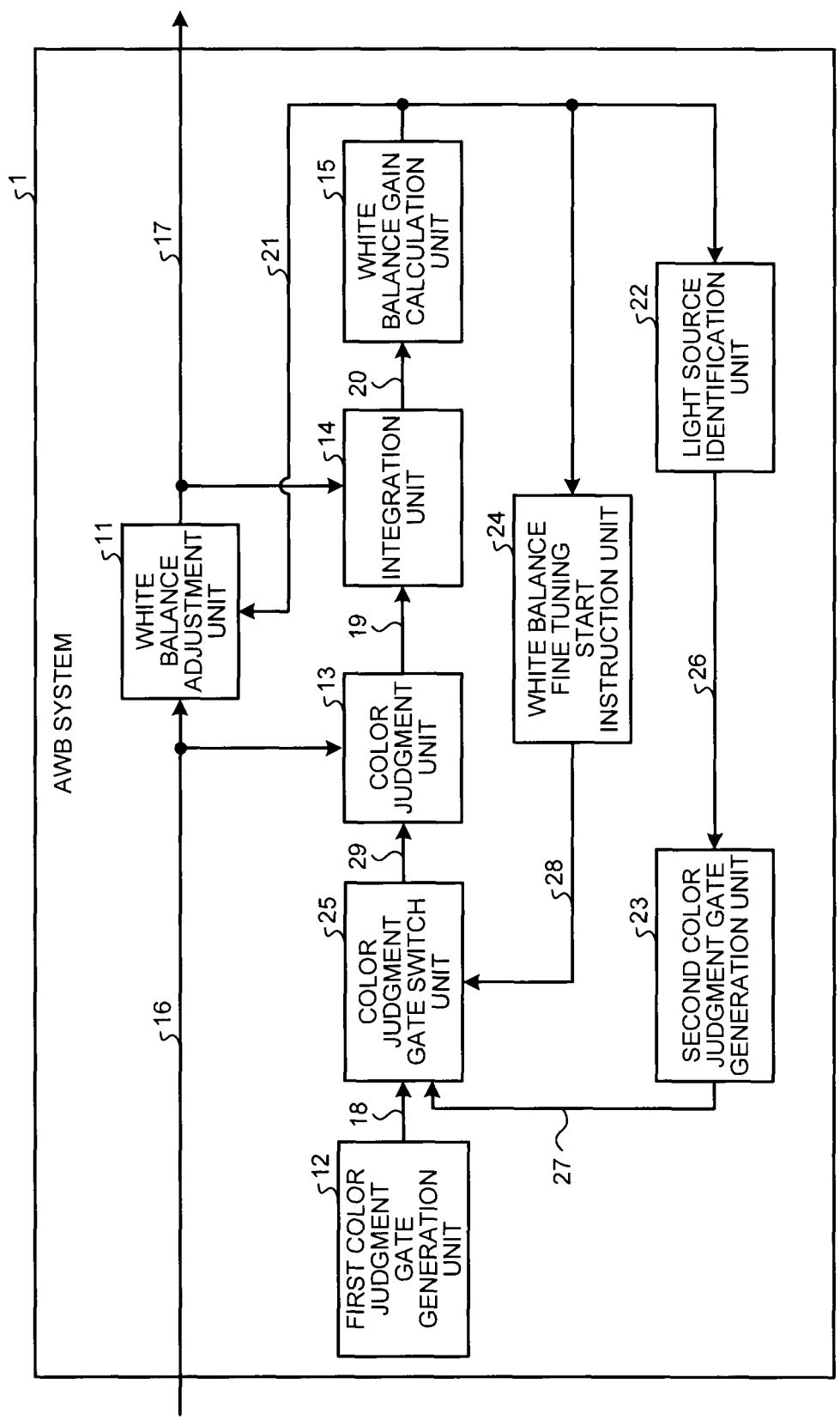
FIG. 2 is a block diagram illustrating the configuration of the AWB system.

FIG. 2 is a block diagram illustrating the configuration of the AWB system. The AWB system 1 includes a white balance adjustment unit 11, a first color judgment gate generation unit 12, a color judgment unit 13, an integration unit 14, a white balance gain calculation unit 15, a light source identification unit 22, a second color judgment gate generation unit 23, a white balance fine tuning start instruction unit 24, and a color judgment gate switch unit 25.

The white balance adjustment unit 11 multiplies a white balance gain 21 by an image signal 16 on which a white balance adjustment has not been performed. The white balance adjustment unit 11 outputs a multiplication result as an image signal 17 on which the white balance adjustment has been performed. The first color judgment gate generation unit 12 generates a first color judgment gate and outputs it as a first color judgment gate signal 18. The first color judgment gate defines the entire color-temperature range subject to the white balance adjustment performed by the AWB system 1.

Figure 3:
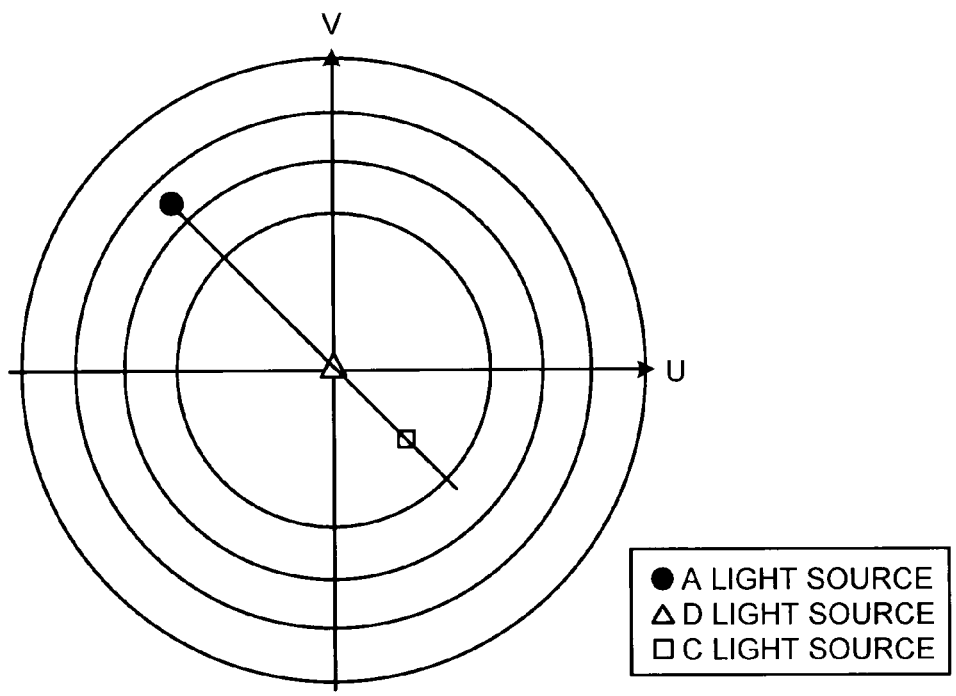
FIG. 3 is a graph illustrating an example of locus distribution of a color temperature in a color space.

FIG. 3 is a graph illustrating an example of locus distribution of a color temperature in a color space. A color-difference signal U is set as a lateral axis of the graph and a color-difference signal V is set as a vertical axis of the graph. In this embodiment, there is assumed a case where an A light source, a D light source, and a C light source are provided in which light-source colors are plotted on a straight line in a UV coordinate system. The color temperatures of the A light source, the D light source, and the C light source which are standard light sources are about 2800K, 6500K, and 6800K, respectively.

Figure 4:
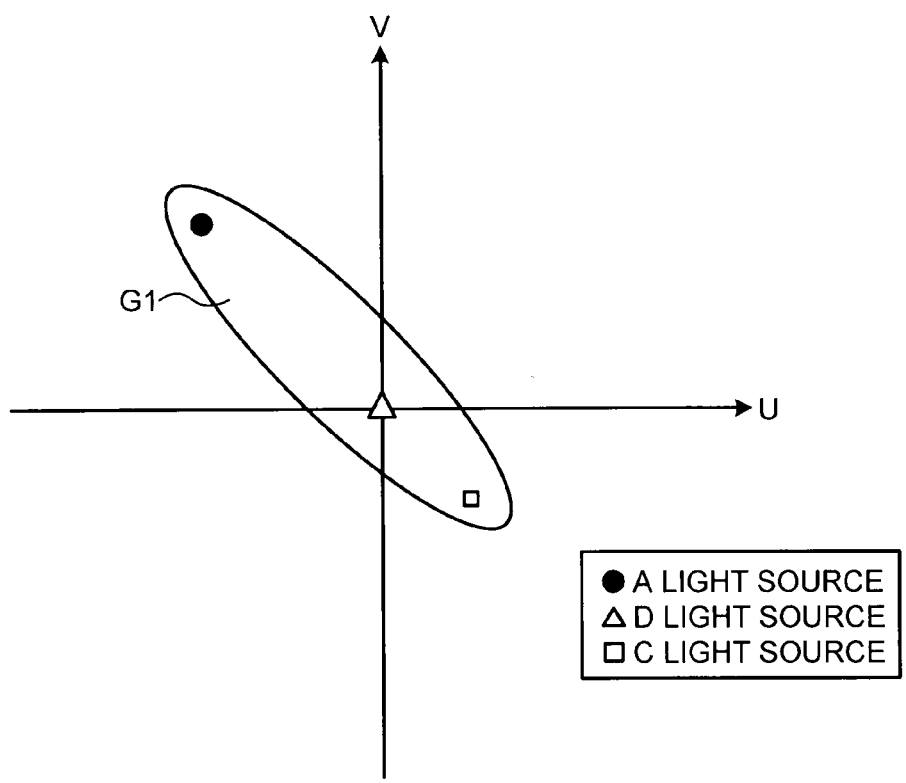
FIG. 4 is a graph explaining an example of the first color judgment gate.

FIG. 4 is a graph explaining an example of the first color judgment gate. The first color judgment gate G1 is set such that any light-source color range of the A light source, the D light source, and the C light source subject to white balance adjustment performed by the AWB system 1 is included collectively.

The color judgment gate switch unit 25 illustrated in FIG. 2 selects either a first color judgment gate signal 18 or a second color judgment gate signal 27 mentioned later, and outputs the selected signal as a color judgment gate signal 29. The color judgment gate switch unit 25 switches between the first color judgment gate 18 and the second color judgment gate 27, as a reference for selecting pixel data for calculating a white balance gain 21.

The color judgment unit 13 performs color judgment of the image signal 16 on which the white balance adjustment has not been performed, based on the color judgment gate signal 29. The color judgment unit 13 extracts a pixel used to calculate the white balance gain 21 through the color judgment, and outputs the extracted result as an integration-target pixel signal 19.

The integration unit 14 integrates a signal value (pixel data) per one frame, by using only pixels relevant to the integration-target pixel signal 19, out of the image signal 17 on which the white balance adjustment has been performed. The integration unit 14 integrates the pixel data judged to be used to calculate the white balance gain 21 and then outputs integration data 20. The integration data 20 is data related to integrations, and may include an integrated value of the image data, its integrated pixel count, and an average value of the pixel data per one pixel. The average value of the pixel data per one pixel is obtained by dividing the integrated value with the integrated pixel count.

The white balance gain calculation unit 15 calculates the white balance gain 21 on the basis of the integration data 20.

The white balance gain 21 is reflected in the image signal 16 present in a frame subsequent to the frame subject to integration in the integration unit 14.

The light source identification unit 22 identifies the light source present during capturing the image according to the white balance gain 21. The light source identification unit 22 outputs a result in which the light source is identified as a light source identification signal 26.

Figure 5:
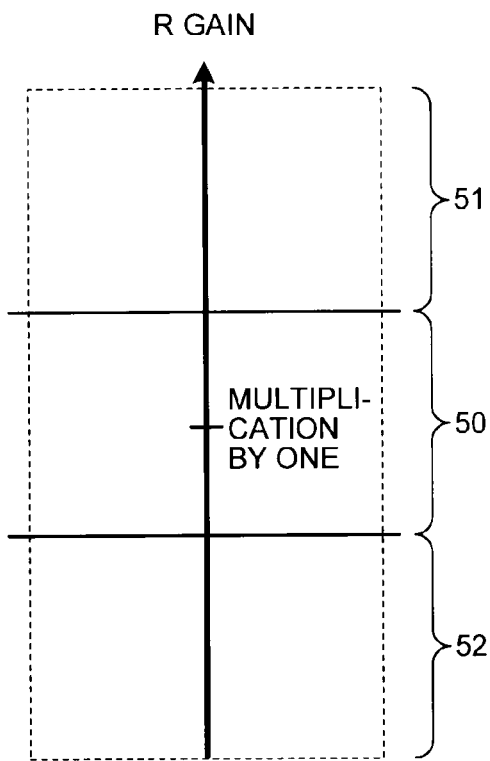
FIG. 5 is a diagram explaining an example of a method of identifying a light source in a light source identification unit.

FIG. 5 is a diagram explaining an example of a method of identifying a light source in the light source identification unit. The light source identification unit 22, for example, identifies any one of the A light source, the D light source, and the C light source depending upon the size of an R gain that is a white balance gain 21. For example, when the R gain is included in a predetermined range 50 in which a magnification mainly is 1, the light source identification unit 22 identifies the D light source. When the R gain is included in a range 51 which has a value greater than an upper limit of the range 50, the light source identification unit 22 identifies the C light source. When the R gain is included in a range 52 which has a value smaller than a lower limit of the range 50, the light source identification unit 22 identifies the A light source.

The second color judgment gate generation unit 23 illustrated in FIG. 2 generates a second color judgment gate for each light source identified by the light source identification unit 22. The second color judgment gate defines a color-temperature range subject to a white balance adjustment for each light source identified according to the white balance gain 21. The second color judgment gate generation unit 23 selects the second color judgment gate corresponding to the light source identified by the light source identification unit 22 corresponding to the light source identification signal 26 and outputs it as a second color judgment gate signal 27.

Figure 6:
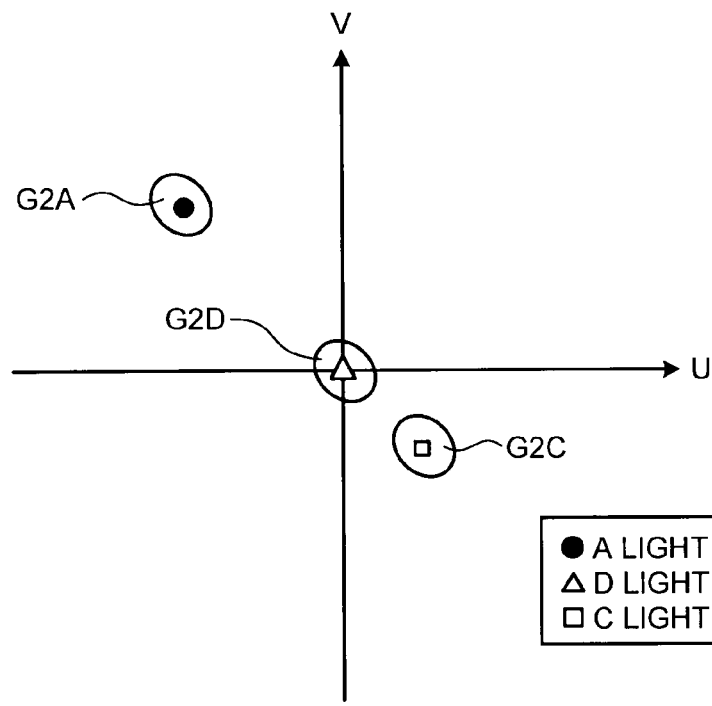
FIG. 6 is a graph explaining an example of the second color judgment gate.

FIG. 6 is a graph explaining an example of the second color judgment gate. The second color judgment gate generation unit 23 generates second color judgment gates G2A, G2D, and G2C for the A light source, the D light source, and the C light source, respectively. The second color judgment gate G2A for the A light source is set where a light-source color of the A light source predominantly occupies. The second color judgment gate G2D for the D light source is set where a light-source color of the D light source predominantly occupies. The second color judgment gate G2C for the C light source is set where a light-source color of the C light source predominantly occupies. The color-temperature ranges of the second color judgment gates G2A, G2D, and G2C are separated from each other and are set with intervals. The intervals among the color-temperature ranges in the second color judgment gates G2A, G2D, and G2C can be appropriately set.

Upon confirmation of a change in the white balance gain 21 has converged in a predetermined range, a white balance fine tuning start instruction unit 24 illustrated in FIG. 2 outputs a white balance fine tuning start signal 28 which instructs to start a white balance fine tuning. The white balance fine tuning start instruction unit 24 generates a timing of a transition from a normal white balance adjustment by the first color judgment gate to a fine tuning of a white balance by the second color judgment gate, as the white balance fine tuning start signal 28. The color judgment gate switch unit 25 switches from the first color judgment gate to the second color judgment gate, according to the white balance fine tuning start signal 28.

The color judgment gate switch unit 25 selects the first color judgment gate signal 18 until it is confirmed in the white balance fine tuning start instruction unit 24 that the change in the white balance gain 21 has converged in a predetermined range and outputs it as a color judgment gate signal 29. The white balance adjustment unit 11 implements a white balance adjustment by using the first color judgment gate G1, as a reference.

The second color judgment gate generation unit 23 selects any one of the second color judgment gates G2A, G2D and G2C generated for each light source according to the light source identification signal 26 and outputs it as the second color judgment gate signal 27. If it is confirmed in the white balance fine tuning start instruction unit 24 that the change in the white balance gain 21 has converged in a predetermined range and the white balance fine tuning start signal 28 is output, then the color judgment gate switch unit 25 selects the second color judgment gate signal 27 and outputs it as the color judgment gate signal 29. The white balance adjustment unit 11 switches a white balance adjustment from the normal adjustment in which the first color judgment gate G1 is used as a reference to the fine tuning in which any one of the second color judgment gates G2A, G2D, and G2C is used as a reference.

The AWB system 1 uses the second color judgment gates G2A, G2D, and G2C prepared in advance for each light source by which it is possible to select the pixel data subject to integration with high accuracy depending upon the light source at the time of shooting. In the AWB system 1, a color portion other than the light-source color can be highly accurately excluded from the integration target, and as a result, it is possible to achieve a highly accurate white balance adjustment. In the AWB system 1, as a result of the application of the light source identification unit 22, it is possible to identify a light source with a simple calculation taking advantage of the white balance gain 21, even without using a relatively large memory such as a block memory. This allows the AWB system 1 to inhibit a circuit scale.

The AWB system 1 is not limited to a system in which the fine tuning of the white balance is performed by applying the second color judgment gate corresponding to the A light source, the D light source, and the C light source. The second color judgment gate may also correspond to a light source other than the A light source, the D light source, and the C light source. Further, a plurality of light sources made to correspond to the second color judgment gate may suffice, and the light sources may be provided in any number other than three.

Figure 7:
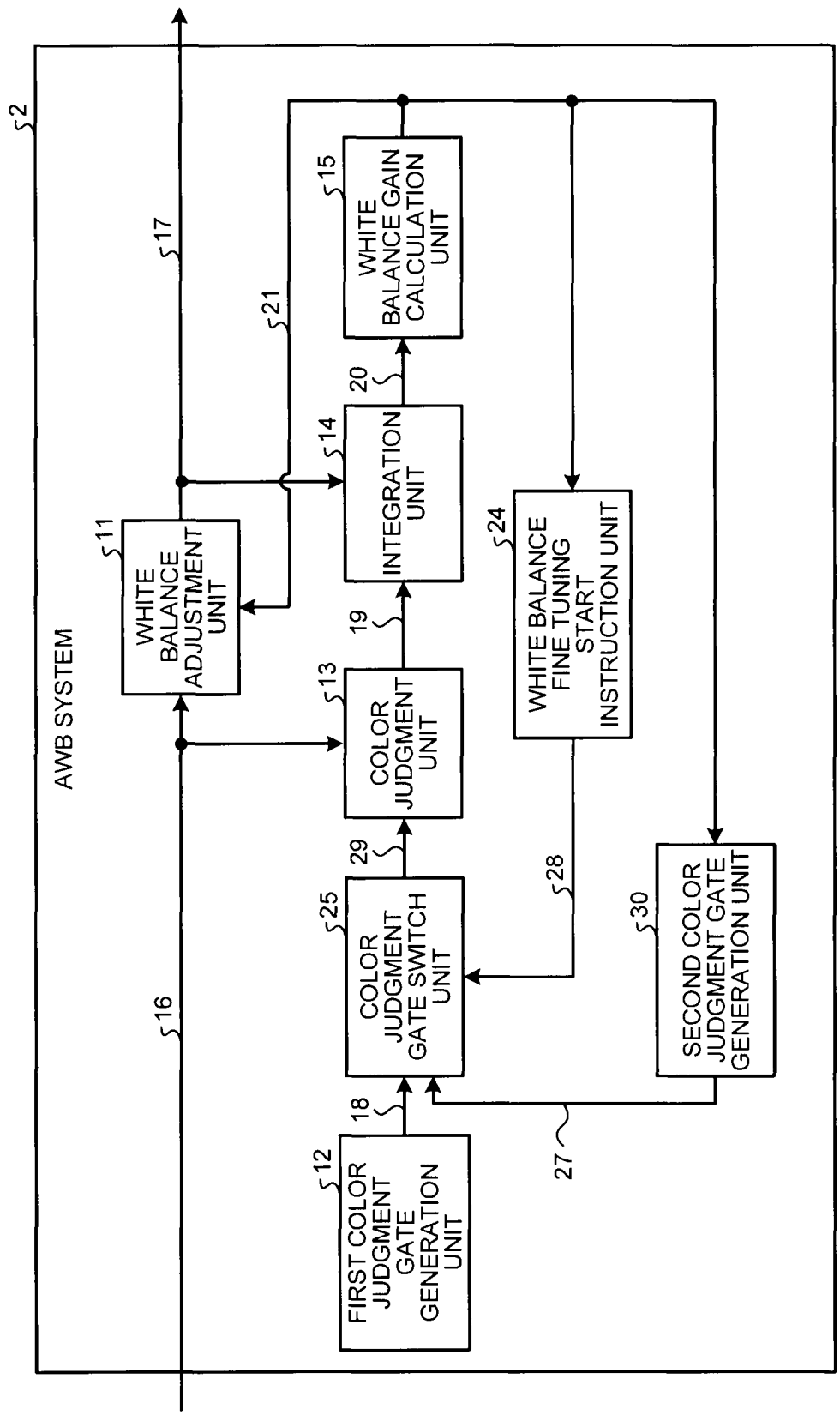
FIG. 7 is a block diagram illustrating the configuration of an AWB system according to a second embodiment.

FIG. 7 is a block diagram illustrating the configuration of an AWB system according to a second embodiment. The AWB system 2 according to the second embodiment includes the white balance adjustment unit 11, the first color judgment gate generation unit 12, the color judgment unit 13, the integration unit 14, the white balance gain calculation unit 15, the white balance fine tuning start instruction unit 24, the color judgment gate switch unit 25, and a second color judgment gate generation unit 30. The second color judgment gate generation unit 30 is arranged instead of the second color judgment gate generation unit 23 and the light source identification unit 22 (see FIG. 2) in the first embodiment. Like reference numerals are used to refer to like components in the first embodiment and the duplicated description thereof will not be repeated where appropriate.

The second color judgment gate generation unit 30 generates the second color judgment gate for a light source that is previously designated as a reference. Moreover, the second color judgment gate generation unit 30 changes the color-temperature range of the generated second color judgment gate according to the white balance gain 21.

Figure 8:
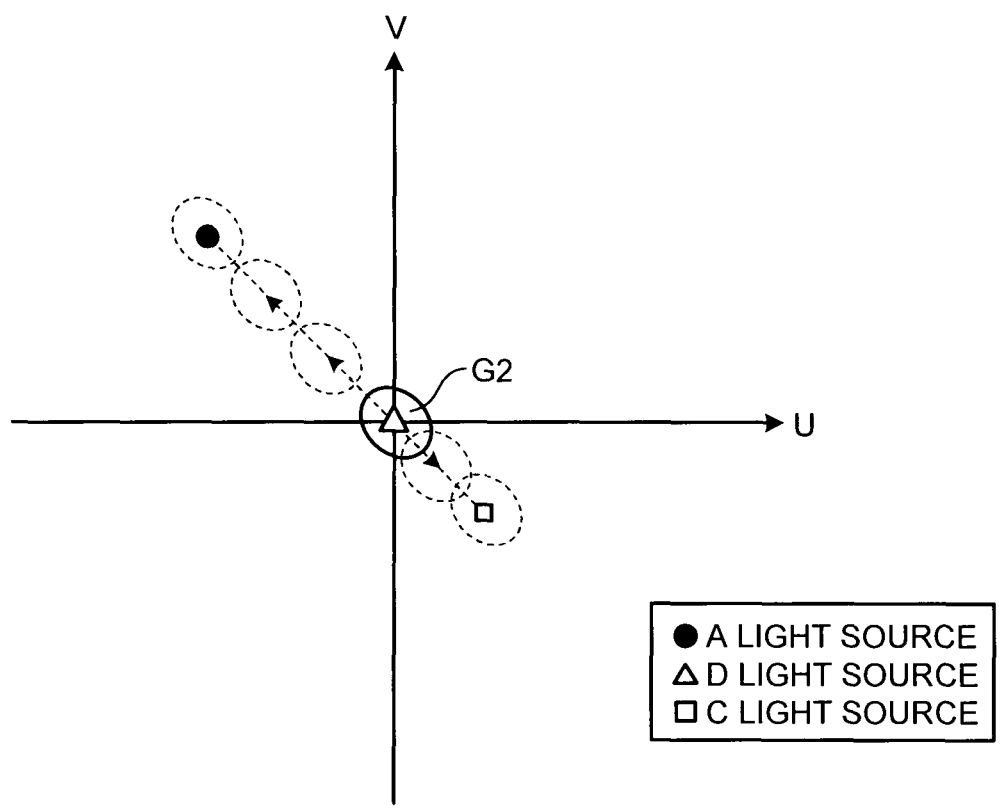
FIG. 8 is a graph explaining an example of the second color judgment gate.

FIG. 8 is a graph explaining an example of the second color judgment gate. The second color judgment gate generation unit 30 generates, as a reference, the second color judgment gate G2 of the range predominantly occupied by the light-source color of the D light source, for example. Moreover, the second color judgment gate generation unit 30 continuously shifts the second color judgment gate G2 from the range predominantly occupied by the light-source color of the A light source to the range predominantly occupied by the light-source color of the C light source, according to the white balance gain 21.

In the AWB system 2, not only the fine tuning of the white balance by each previously assumed light source, but also the fine tuning of the white balance by the second color judgment gate G2 corresponding to an intermediate color temperature of the light sources are enabled. The AWB system 2 can freely deal with the color temperature and excludes other color portions from the integration target. As a result, highly accurate white balance adjustment is enabled. A memory scale can be reduced in the AWB system 2, as compared to a case where the second color judgment gate corresponding to a plurality of light sources is maintained.

Figure 9:
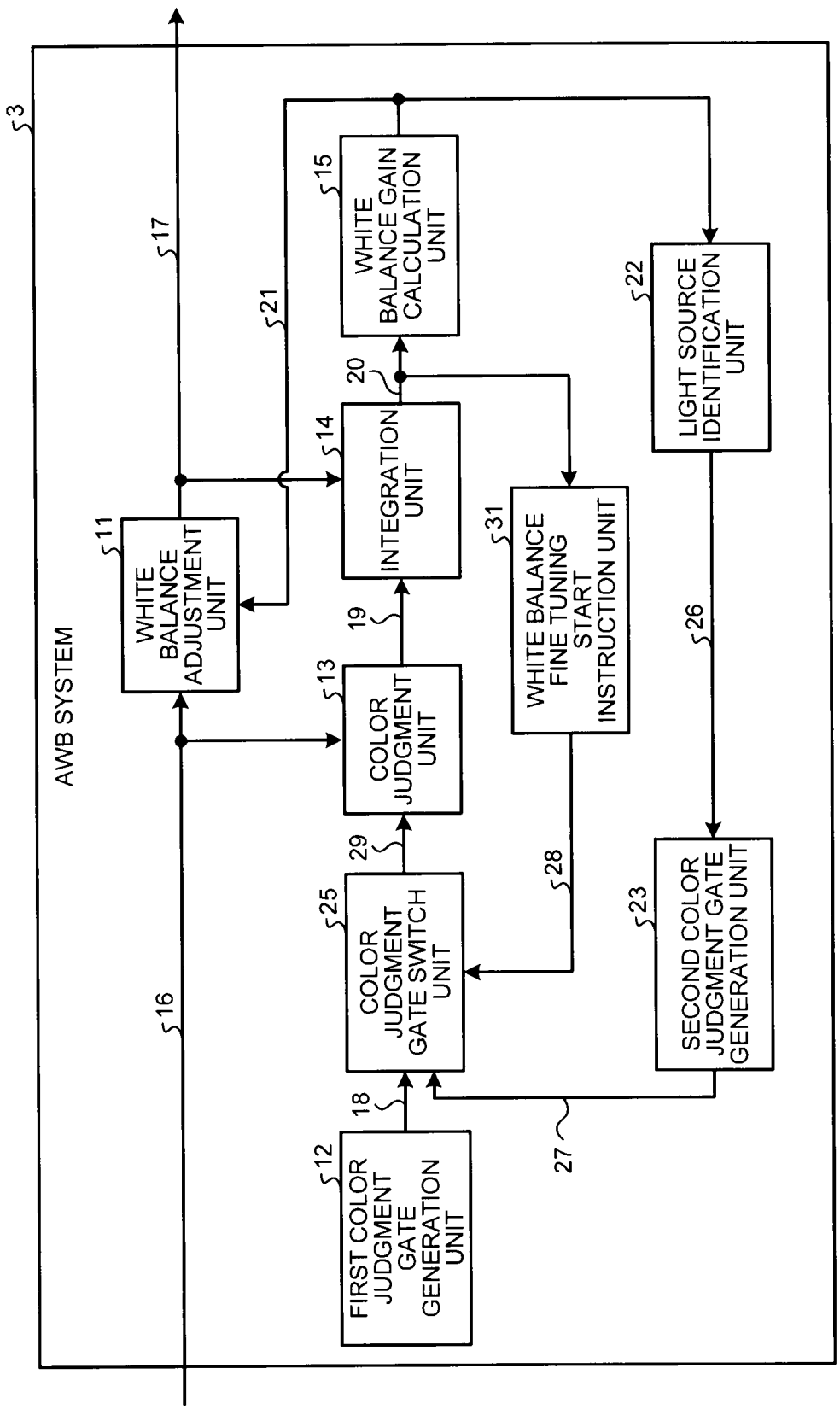
FIG. 9 is a block diagram illustrating the configuration of an AWB system according to a third embodiment.

FIG. 9 is a block diagram illustrating the configuration of an AWB system according to a third embodiment. The AWB system 3 according to the third embodiment includes the white balance adjustment unit 11, the first color judgment gate generation unit 12, the color judgment unit 13, the integration unit 14, the white balance gain calculation unit 15, the light source identification unit 22, the second color judgment gate generation unit 23, the color judgment gate switch unit 25, and a white balance fine tuning start instruction unit 31. The white balance fine tuning start instruction unit 31 is arranged instead of the white balance fine tuning start instruction unit 24 (see FIG. 2) present in the first embodiment. Like reference numerals are used to refer to like components in the first embodiment and the duplicated description thereof will not be repeated where appropriate.

Upon confirmation that the integrated value of the pixel data that is the integration data 20, for example, falls below a predetermined threshold value, the white balance fine tuning start instruction unit 31 outputs a white balance fine tuning start signal 28.

Similarly to the first embodiment, in the AWB system 3, a color portion other than the light-source color can be highly accurately excluded from the integration target and, as a result, it is possible to achieve a highly accurate white balance adjustment. In the AWB system 3, it is possible to instruct to switch to the fine tuning of the white balance at an earlier stage, as compared to a case where it is necessary to wait for the convergence of the change in the white balance gain 21. As a result, a time period until the completion of the white balance gain adjustment can be reduced in the AWB system 3.

In the AWB system 3, the fine tuning of the white balance is started before the change in the white balance gain 21 once converges, and in this way, the white balance gain 21 is converged without stopping the change. Consequently, for example, when shooting a moving picture, a natural video can be obtained with a good white balance. Similarly to the second embodiment, the AWB system 3 may also adopt the second color judgment gate generation unit 30 (see FIG. 7) in which the color-temperature range of the second color judgment gate is changed according to the white balance gain 21.

Figure 10:
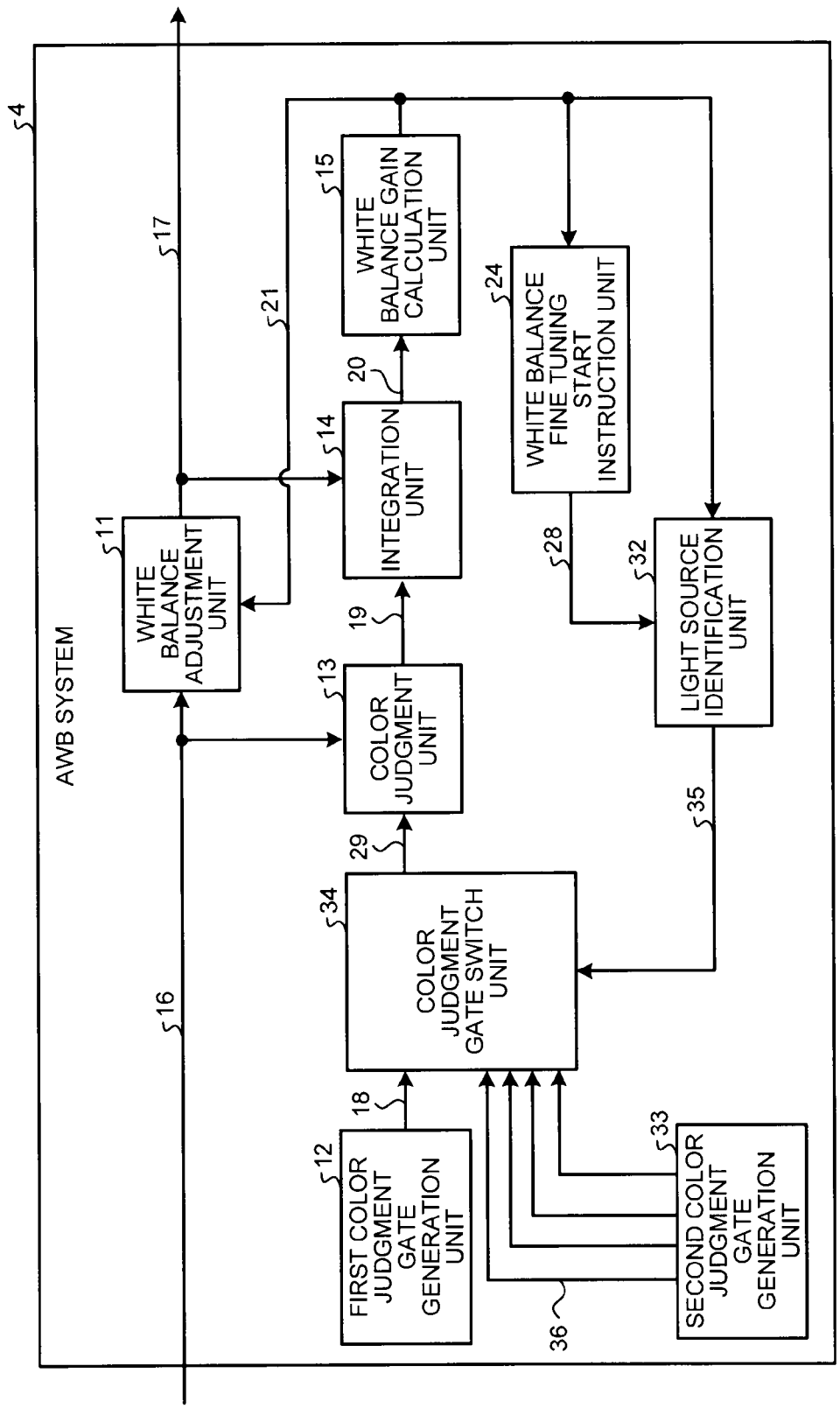
FIG. 10 is a block diagram illustrating the configuration of an AWB system according to a fourth embodiment.

FIG. 10 is a block diagram illustrating the configuration of an AWB system according to a fourth embodiment. The AWB system 4 according to the fourth embodiment includes the white balance adjustment unit 11, the first color judgment gate generation unit 12, the color judgment unit 13, the integration unit 14, the white balance gain calculation unit 15, the white balance fine tuning start instruction unit 24, a light source identification unit 32, a second color judgment gate generation unit 33, and a color judgment gate switch unit 34. The light source identification unit 32, the second color judgment gate generation unit 33, and the color judgment gate switch unit 34 are arranged instead of the light source identification unit 22, the second color judgment gate generation unit 23, and the color judgment gate switch unit 25 (see FIG. 2) present in the first embodiment. Like reference numerals are used to refer to like components in the first embodiment and the duplicated description thereof will not be repeated where appropriate.

The light source identification unit 32 identifies the light source present during capturing the image according to the white balance gain 21. The light source identification unit 32 identifies the light source according to the white balance fine tuning start signal 28. The white balance fine tuning start instruction unit 24 generates a timing of identifying the light source as the white balance fine tuning start signal 28. The light source identification unit 32 generates a color judgment gate selection signal 35 which includes information on whether the light source is identified as well as the information on the identified light source, according to the white balance fine tuning start signal 28.

The second color judgment gate generation unit 33 generates the second color judgment gate for each light source identified by the light source identification unit 32. The second color judgment gate generation unit 33 outputs all the second color judgment gates generated for each light source as the second color judgment gate signal 36.

The color judgment gate switch unit 34 selects either the first color judgment gate signal 18 or the second color judgment gate signal 36 and outputs the selected signal as the color judgment gate signal 29. Once the color judgment gate selection signal 35 is output from the light source identification unit 32, the color judgment gate switch unit 34 selects any one of the second color judgment gates for each light source, according to the color judgment gate selection signal 35, and outputs the selected signal as the color judgment gate signal 29.

Similarly to the first embodiment, in the AWB system 4, a color portion other than the light-source color can be highly accurately excluded from the integration target, and as a result, it is possible to achieve a highly accurate white balance adjustment. In the AWB system 4, it is possible to adjust the timing of switching to the fine tuning of the white balance by adjusting a timing of identifying a light source. Further, similarly to the third embodiment, the AWB system 4 may adopt the white balance fine tuning start instruction unit 31 (see FIG. 9) which outputs the white balance fine tuning start signal 28 with reference to the integration data 20 instead of the white balance gain 21.

Figure 11:
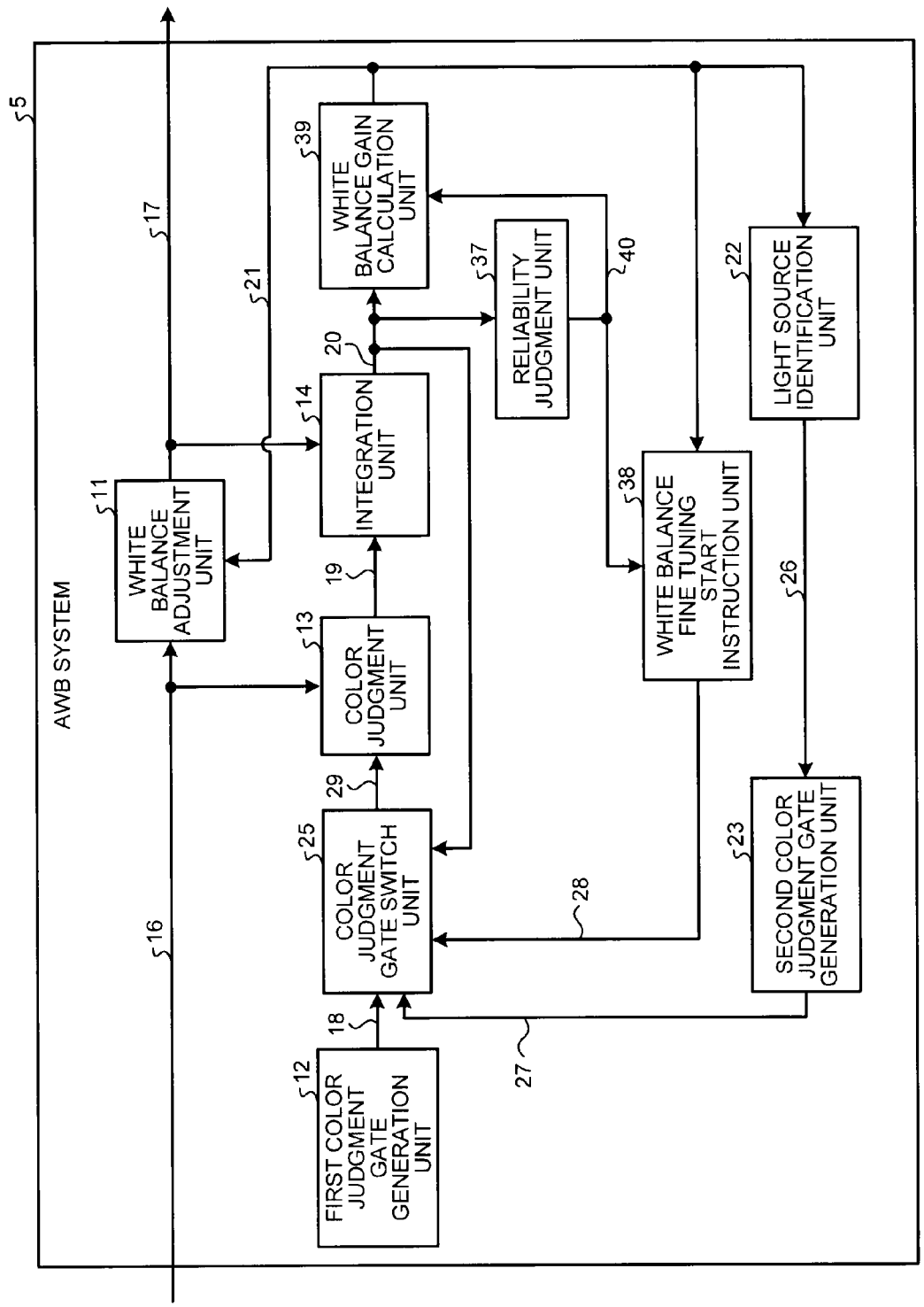
FIG. 11 is a block diagram illustrating the configuration of an AWB system according to a fifth embodiment.

FIG. 11 is a block diagram illustrating the configuration of an AWB system according to a fifth embodiment. The AWB system 5 according to the fifth embodiment includes the white balance adjustment unit 11, the first color judgment gate generation unit 12, the color judgment unit 13, the integration unit 14, the light source identification unit 22, the second color judgment gate generation unit 23, a reliability judgment unit 37, a white balance fine tuning start instruction unit 38, and a white balance gain calculation unit 39. The white balance fine tuning start instruction unit 38 and the white balance gain calculation unit 39 are arranged instead of the white balance fine tuning start instruction unit 24 and the white balance gain calculation unit 15 (see FIG. 2) present in the first embodiment. The reliability judgment unit 37 is added in this embodiment. Like reference numerals are used to refer to like components in the first embodiment and the duplicated description thereof will not be repeated where appropriate.

The color judgment gate switch unit 25 detects that the light source has changed based on the changes in integration data 20. If it is detected that the light source has changed after switching the adjustment of the white balance to the fine tuning where the second color judgment gate is used as a reference, then the color judgment gate switch unit 25 switches to the adjustment where the first color judgment gate is used as a reference as an operation of readjusting the white balance. Then, the AWB system 5 identifies the light source and performs the fine tuning of the white balance according to the second color judgment gate. Similarly to this embodiment, the readjustment operation of the white balance described above is performed also in the first to fourth embodiments, for example.

The reliability judgment unit 37 judges the reliability of the act of identifying the light source in the light source identification unit 22 by comparing the integration data 20 for each frame. For example, when it is confirmed that the integrated pixel count immediately before identifying the light source and the integrated pixel count immediately after identifying the light source are almost constant, the reliability judgment unit 37 turns ON a light source identification feasibility signal 40, regarding that the identification of the light source is reliable.

When the light source identification feasibility signal 40 is ON, the white balance fine tuning start instruction unit 38 keeps turning ON the white balance fine tuning start signal 28. The AWB system 5 continues the operation that has been performed in the circuit after the light source is identified. When the light source identification feasibility signal 40 is OFF, the white balance fine tuning start instruction unit 38 turns OFF the white balance fine tuning start signal 28. The AWB system 5 returns to the operation that has been performed in the circuit before the light source is identified.

When the light source identification feasibility signal 40 is ON, the white balance gain calculation unit 39 calculates the white balance gain 21. When the light source identification feasibility signal 40 is OFF, the white balance gain calculation unit 39 stops the calculation of the white balance gain 21.

Similarly to the first embodiment, in the AWB system 5, a color portion other than the light-source color can be highly accurately excluded from the integration target, and as a result, it is possible to achieve a highly accurate white balance adjustment. Further, in the AWB system 5, the reliability of identifying the light source can be improved by arranging the reliability judgment unit 37.

Similarly to the second embodiment, the AWB system 5 may also adopt the second color judgment gate generation unit 30 (see FIG. 7) in which the color-temperature range of the second color judgment gate is changed according to the white balance gain 21. Further, similarly to the white balance fine tuning start instruction unit 31 (see FIG. 9) in the third embodiment, the white balance fine tuning start instruction unit 38 may be configured to output the white balance fine tuning start signal 28 with reference to the integration data 20 instead of the white balance gain 21.

The camera module 100 according to the first to fifth embodiments may also be an electronic device, such as a mobile phone with camera, other than a digital camera.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An auto white balance adjustment system in a processor, the system configured to comprise:
   a white balance gain calculation unit configured to calculate a white balance gain for a white balance adjustment;
   a color judgment unit configured to extract pixels used to calculate the white balance gain by performing color judgment based on a color judgment gate;
   a first color judgment gate generation unit configured to generate a first color judgment gate that defines an entire range of a color temperature subject to the white balance adjustment;
   a second color judgment gate generation unit configured to generate a second color judgment gate that defines a range of the color temperature subject to the white balance adjustment for each light source identified according to the white balance gain; and
   a color judgment gate switch unit configured to switch the color judgment gate between the first color judgment gate and the second color judgment gate, wherein
   the color judgment gate switch unit switches the color judgment gate according to a change in the white balance gain for each frame.

2. The auto white balance adjustment system according to claim 1, further configured to comprise:
   a light source identification unit configured to identify the light source during capturing an image, wherein
   the second color judgment gate generation unit generates the second color judgment gate for each light source identified by the light source identification unit.

3. The auto white balance adjustment system according to claim 2, further configured to comprise:
   a white balance fine tuning start instruction unit configured to instruct to start a fine tuning of a white balance upon confirmation that the change in the white balance gain has converged, wherein
   the light source identification unit generates a color judgment gate selection signal including information on the identified light source according to the instruction of the white balance fine tuning start instruction unit, and
   the color judgment gate switch unit selects any one of the second color judgment gates for each light source, according to the color judgment gate selection signal from the light source identification unit.

4. The auto white balance adjustment system according to claim 2, further configured to comprise:
   an integration unit configured to integrate pixel data of the pixels extracted by the color judgment unit, and output integration data obtained by the integration; and
   a reliability judgment unit configured to judge a reliability about identification of the light source in the light source identification unit, by comparing the integration data for each frame.

5. The auto white balance adjustment system according to claim 2, wherein
   the color judgment gate switch unit switches the color judgment gate from the second color judgment gate to the first color judgment gate, when it is detected that there is a change in the light source identified by the light source identification unit after switching the white balance adjustment to a fine tuning where the second color judgment gate is used as a reference.

6. The auto white balance adjustment system according to claim 1, further configured to comprise:
   a white balance fine tuning start instruction unit configured to instruct to start a fine tuning of a white balance upon confirmation that the change in the white balance gain has converged, wherein
   the color judgment gate switch unit switches the color judgment gate from the first color judgment gate to the second color judgment gate, according to the instruction by the white balance fine tuning start instruction unit.

7. The auto white balance adjustment system according to claim 1, further configured to comprise:
   an integration unit configured to integrate pixel data of the pixels extracted by the color judgment unit, and output integration data obtained by the integration, wherein
   the white balance gain calculation unit calculates the white balance gain on the basis of the integration data, and
   the color judgment gate switch unit switches the color judgment gate on the basis of the integration data for each frame.

8. The auto white balance adjustment system according to claim 7, further configured to comprise:
   a white balance fine tuning start instruction unit configured to instruct to start a fine tuning of a white balance upon confirmation that the integration data falls below a threshold value, wherein
   the color judgment gate switch unit switches the color judgment date from the first color judgment gate to the second color judgment gate according to the instruction by the white balance fine tuning start instruction unit.

9. The auto white balance adjustment system according to claim 1, wherein
   the second color judgment gate generation unit generates the second color judgment gate for the light source set beforehand as the reference, and changes the range of the color temperature of the second color judgment gate according to the white balance gain.

10. The auto white balance adjustment system according to claim 9, wherein
    the second color judgment gate generation unit enables a continuous shift of the range of the color temperature used as the second color judgment gate.

11. An auto white balance adjustment method performed in a processor, comprising:
    calculating a white balance gain for a white balance adjustment;
    extracting pixels used to calculate the white balance gain by performing color judgment based on a color judgment gate;
    generating a first color judgment gate that defines an entire range of a color temperature subject to the white balance adjustment;
    generating a second color judgment gate that defines a range of the color temperature subject to the white balance adjustment for each light source identified according to the white balance gain; and
    switching the color judgment gate between the first color judgment gate and the second color judgment gate, wherein
    the color judgment gate is switched according to a change in the white balance gain for each frame.

12. The auto white balance adjustment method according to claim 11, further comprising identifying the light source during capturing an image, wherein the second color judgment gate is generated for each identified light source.

13. The auto white balance adjustment method according to claim 12, further comprising instructing to start a fine tuning of a white balance upon confirmation that the change in the white balance gain has converged, wherein
a color judgment gate selection signal including information on the identified light source is generated according to the instruction of starting the fine tuning, and
any one of the second color judgment gates for each light source is selected according to the color judgment gate selection signal.

14. The auto white balance adjustment method according to claim 11, further comprising instructing to start a fine tuning of a white balance upon confirmation that the change in the white balance gain has converged, wherein
the color judgment gate is switched from the first color judgment gate to the second color judgment gate, according to an instruction of starting the fine tuning.

15. The auto white balance adjustment method according to claim 11, further comprising:
integrating pixel data of the pixels extracted by performing the color judgment; and
outputting integration data obtained by the integration, wherein
the white balance gain is calculated on the basis of the integration data, and
the color judgment gate is switched on the basis of the integration data for each frame.

16. The auto white balance adjustment method according to claim 15, further comprising:
instructing to start a fine tuning of a white balance upon confirmation that the integration data falls below a threshold value, wherein
the color judgment gate is switched from the first color judgment gate to the second color judgment gate, according to an instruction of starting the fine tuning.

17. The auto white balance adjustment method according to claim 11, wherein
the second color judgment gate for the light source set beforehand as the reference is generated, and
the range of the color temperature of the second color judgment gate is changed according to the white balance gain.

18. The auto white balance adjustment method according to claim 17, wherein a continuous shift of the range of the color temperature used as the second color judgment gate is enabled.

19. The auto white balance adjustment method according to claim 11, wherein
the color judgment gate is switched from the second color judgment gate to the first color judgment gate when it is detected that there is a change in the identified light source after switching the white balance adjustment to a fine tuning where the second color judgment gate is used as a reference.

20. A camera module, comprising:
a lens unit configured to take in light from an object and focus an object image;
an image sensor configured to capture the object image; and
a processor including an auto white balance adjustment system configured to perform white balance adjustment on an image signal acquired by capturing in the image sensor, wherein
the auto white balance adjustment system is configured to include:
a white balance gain calculation unit configured to calculate a white balance gain for the white balance adjustment;
a color judgment unit configured to extract pixels used to calculate the white balance gain by performing color judgment based on a color judgment gate;
a first color judgment gate generation unit configured to generate a first color judgment gate that defines an entire range of a color temperature subject to the white balance adjustment;
a second color judgment gate generation unit configured to generate a second color judgment gate that defines the range of the color temperature subject to the white balance adjustment for each light source identified according to the white balance gain; and
a color judgment gate switch unit configured to switch the color judgment gate between the first color judgment gate and the second color judgment gate, wherein
the color judgment gate switch unit switches the color judgment gate according to a change in the white balance gain for each frame.

* * * * *